April 30, 1940.  F. MAIER  2,199,266
DOUGHNUT MACHINE
Filed Aug. 12, 1939  6 Sheets-Sheet 1

INVENTOR,
Frederick Maier
BY
Beau, Brooks, Buckley & Beau.
ATTORNEYS

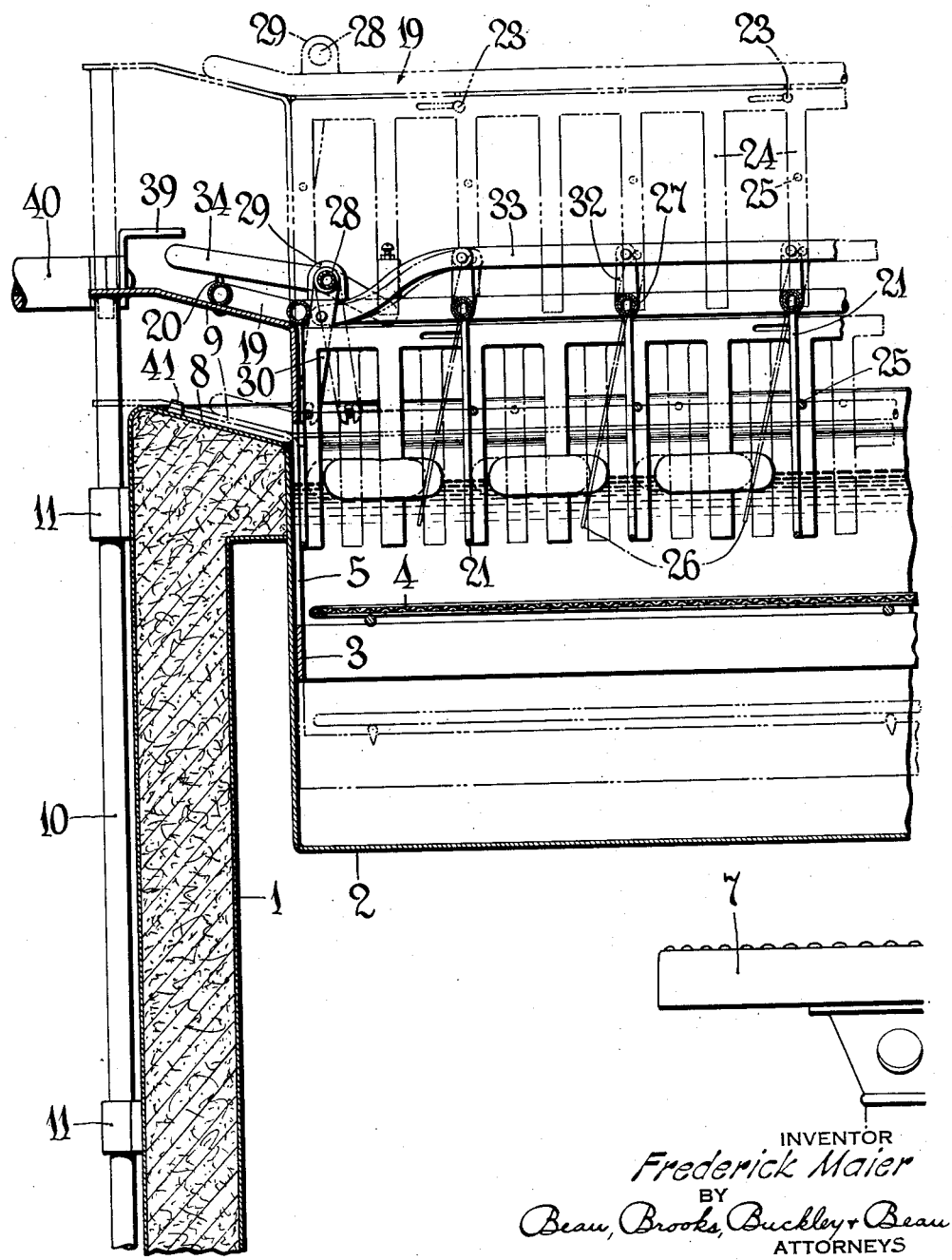

April 30, 1940.  F. MAIER  2,199,266
DOUGHNUT MACHINE
Filed Aug. 12, 1939      6 Sheets-Sheet 3
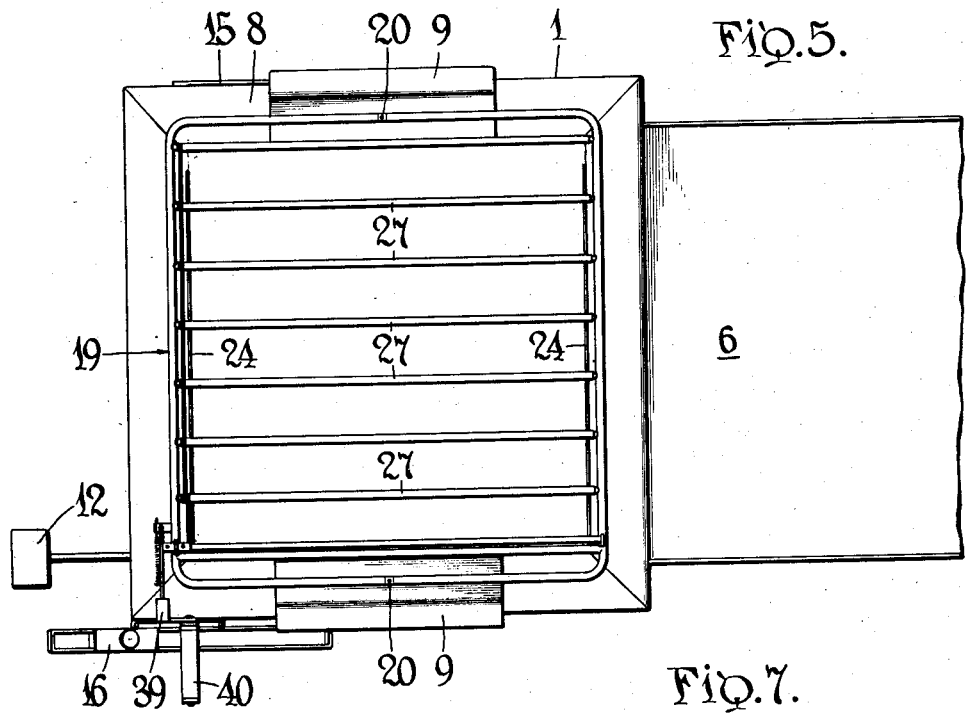
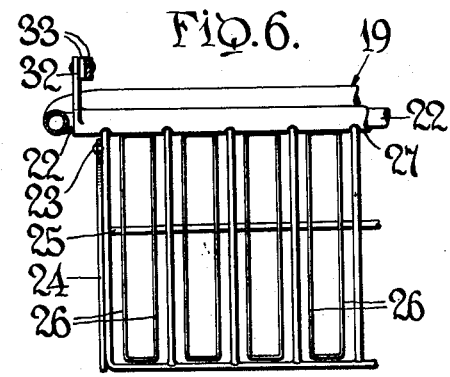
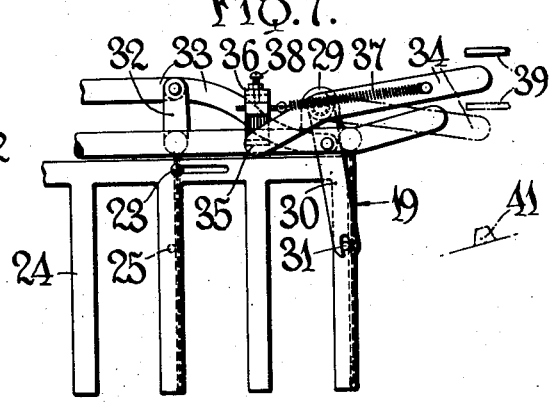
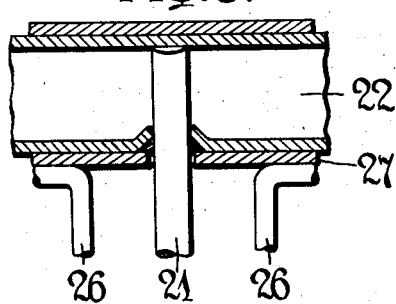
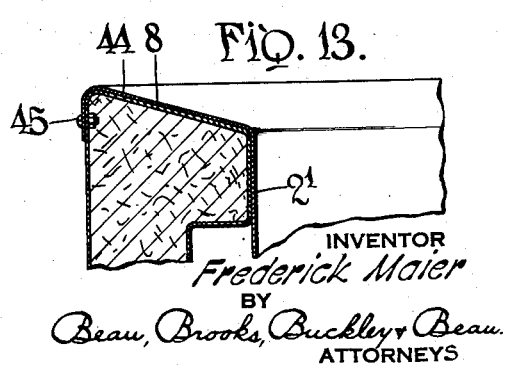
INVENTOR
*Frederick Maier*
BY
*Beau, Brooks, Buckley & Beau.*
ATTORNEYS April 30, 1940.   F. MAIER   2,199,266
DOUGHNUT MACHINE
Filed Aug. 12, 1939   6 Sheets-Sheet 4
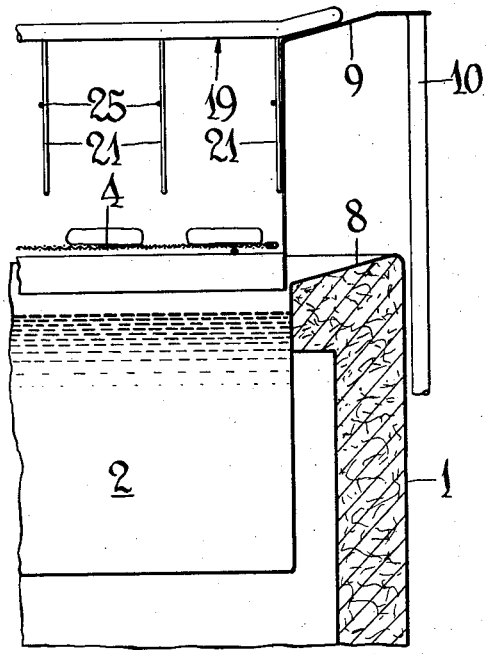
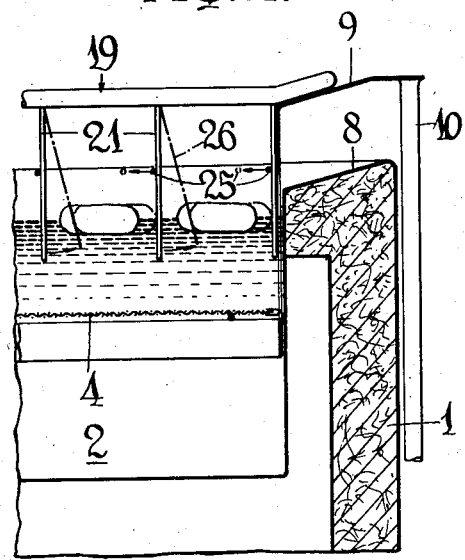
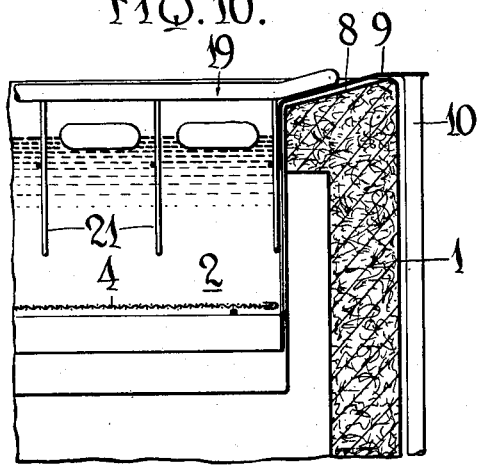
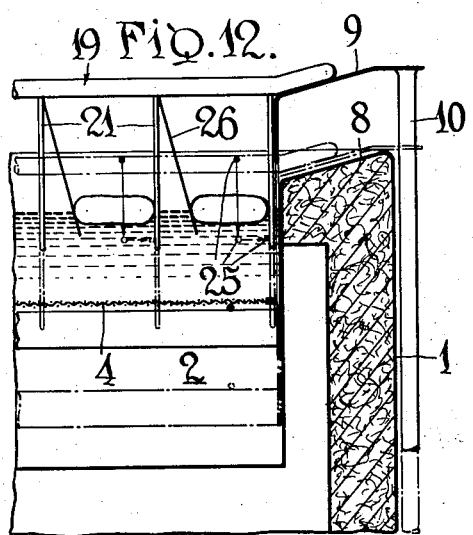
INVENTOR
Frederick Maier
BY
Beau, Brooks, Buckley & Beau.
ATTORNEYS

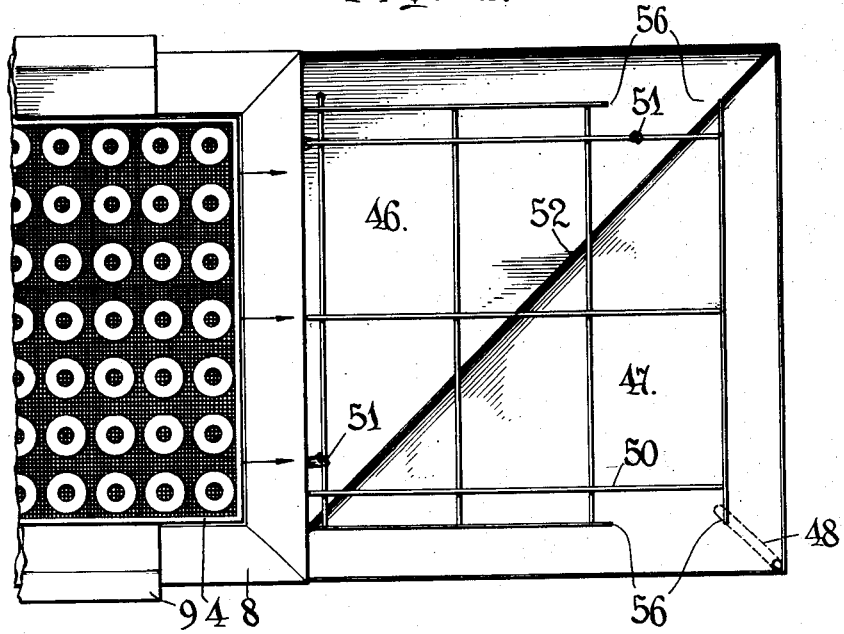
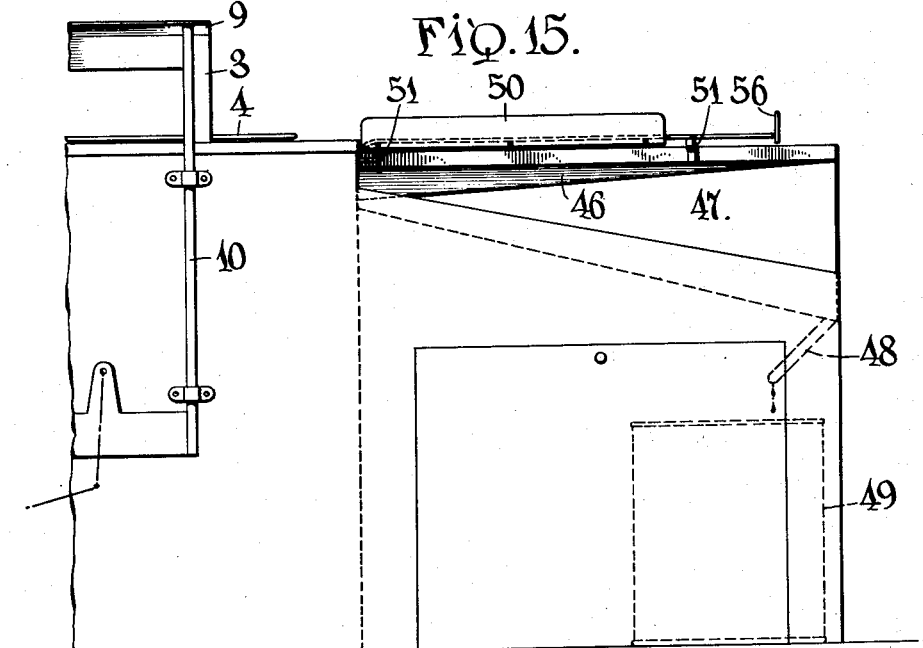

April 30, 1940.    F. MAIER    2,199,266
DOUGHNUT MACHINE
Filed Aug. 12, 1939    6 Sheets-Sheet 6
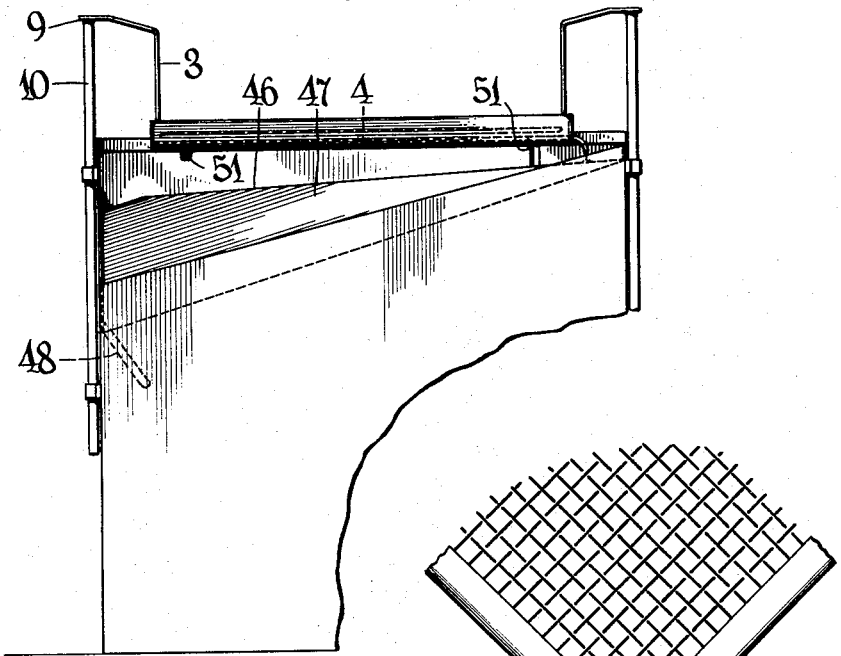
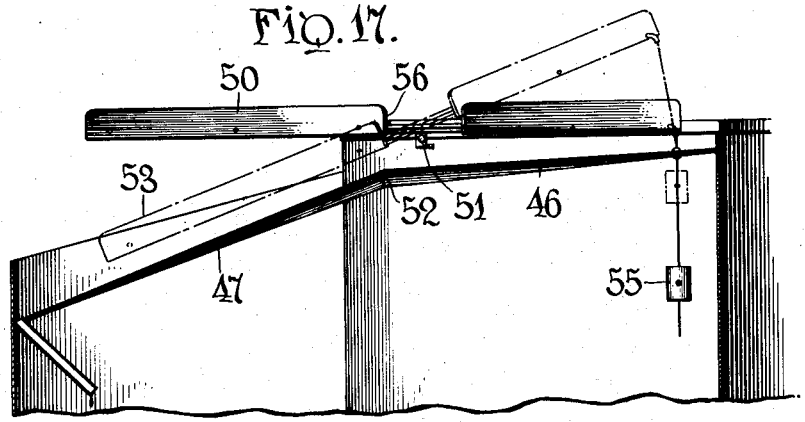
INVENTOR
Frederick Maier
BY
Beau, Brooks, Buckley & Beau.
ATTORNEYS Patented Apr. 30, 1940

2,199,266

UNITED STATES PATENT OFFICE 2,199,266

DOUGHNUT MACHINE

Frederick Maier, Buffalo, N. Y.

Application August 12, 1939, Serial No. 289,871

18 Claims. (Cl. 53—7)

This invention relates to a doughnut making machine and it has for its particular object to provide a machine in which doughnuts may be cooked in large quantities in an efficient manner.

The invention further has for its object to provide means by which improved doughnut turning mechanism is operable in a semi-automatic manner to facilitate the operator's handling of a large batch of doughnuts in an expeditious manner.

Other objects of the invention will manifest themselves as the description progresses, reference being had to the accompanying drawings, wherein Fig. 1 is a side elevation of a doughnut machine construction in accordance with the present invention;

Fig. 4 is an enlarged vertical section showing in fragment the doughnut carrier and its related turner mechanism;

Fig. 5 is a top plan view of the machine as shown in Fig. 1;

Fig. 6 is a fragmentary view of one of the partitions and the related positioning members;

Fig. 7 is a fragmentary view of the turner apparatus showing particularly the automatic snap action employed for holding the doughnut turning mechanism in both its operative and inoperative positions;

Fig. 8 is a detailed sectional view through a portion of the construction shown in Fig. 6;

Figs. 9, 10, 11 and 12 are diagrammatic illustrations showing clearly the manner of effecting the turning of the doughnuts;

Fig. 13 is a fragmentary sectional view of a modification showing the frame provided with a removable vat;

Fig. 14 is a fragmentary top plan view of a doughnut machine showing a modified means for discharging the fried doughnuts;

Fig. 15 is a fragmentary side elevation of such modified doughnut discharging means;

Fig. 16 is an end elevation of the discharge end of the machine;

Fig. 17 is a longitudinal sectional view through the discharge end; and

Fig. 18 is a fragmentary view depicting one of the doughnut trays.

Figure 1:
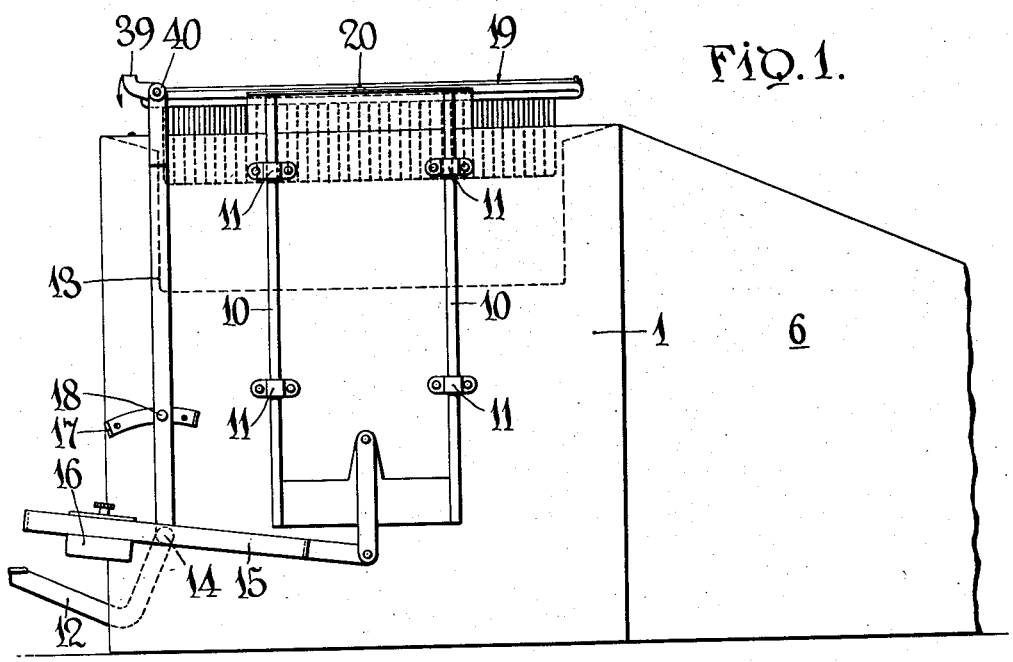
Figure 3:
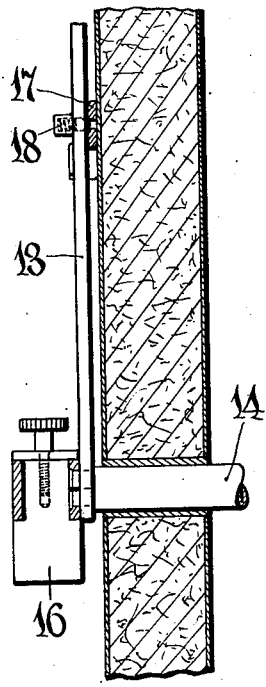
Fig. 3 is a detailed vertical section showing a control lever.
Figure 2:
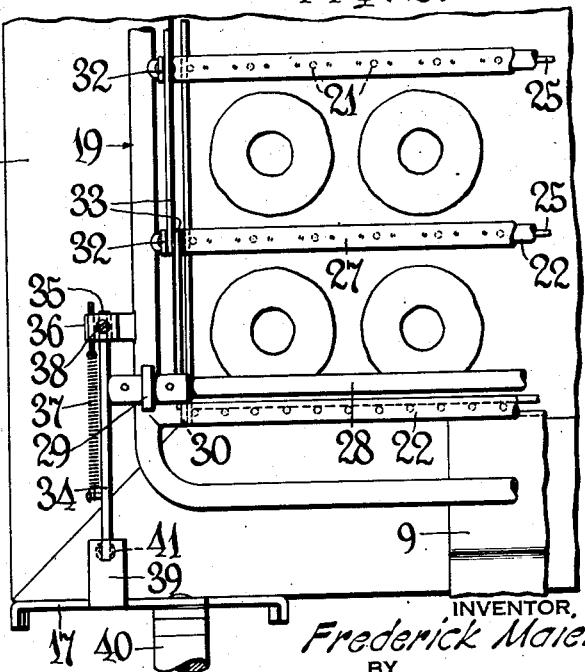
Fig. 2 is a top plan view thereof.

Referring more particularly to the drawings, the numeral 1 designates the frame structure of the machine which provides a vat 2 for holding the frying bath. Mounted for vertical movement into and out of the bath is a carrier 3 having a side entranceway for inserting a doughnut tray 4 and a similar opening in the opposite side to eject the tray onto a drain table 6. The bath is kept at frying temperature by suitable heating means 7, and the upper margin 8 of the vat is beveled to return any of the hot fat to the bath. The trays are generally rectangular and have a wire mesh bottom to pass readily the cooking liquid as the carrier is lowered into and elevated out of the frying bath.

The carrier comprises a sheet metal frame having marginal bracket extensions 9 on the opposite sides thereof for supporting though preferably detachable attachment to lift rods 10 which are slidable in guides 11 on the exterior of the machine. A treadle 12, as well as a hand lever 13, are fixed on a rocker shaft 14 from which extends an arm 15 to move the lift rods vertically, being suitably counterbalanced at 16. A quadrant 17 cooperating with a spring detent 18 on lever 13 determines the several positions of the carrier, such as fully elevated, fully lowered, and an intermediate position from which the turning of the frying doughnuts is effected, the term "doughnut" being inclusive of other pastry products which are fried in a like manner.

For turning the doughnuts, a turner frame 19 is mounted within the carrier frame for removal when "doughnut sticks" or similar products which may require special turning equipment are to be fried. To this end upstanding pins 20 on the brackets 9 are received by apertures in the turner frame as the latter is lowered thereover. The turner frame is divided crosswise by rigid open wire walls 21 suspended from transverse frame members 22. Slidable on guide pins 23 at the ends of these partitions are front and back lattice members 24 which rigidly support the turning rods 25 and form therewith a shiftable frame, the movement of which from a normal position will locate the turning rods a definite distance from the partitions for engaging the floating doughnuts offcenter and tilt them as the rods with the turner assembly are lowered.

Cooperating with the locating frame 24, 25, are doughnut positioning means in the form of wire loops 26 which are pivotally mounted by sleeves 27 on the transverse frame members 22. These loops are normally nested within the partitions 21 to be out of the way and when swung out from the partitions will engage the floating doughnuts and shove them against the adjacent partition beneath the located turning rods 25. The movements of these parts are correlated so as to bring such parts concurrently to their doughnut turning positions indicated by broken lines in Fig. 4. Fixed on a transverse rock shaft 28, journaled in upstanding ears 29 on frame 19, is a depending rocker arm 30 connected by a play connection 31 to the locating frame. Upstanding from each sleeve 27 is an arm 32 articulated to its neighbor arms as well as to the rocker arm 30 by linkage 33.

Rocking the shaft 28 counterclockwise (Fig. 4) will shift the rods 25 to the right, away from their normal position adjacent the partitions 21, and simultaneously swing the positioning loops 26 clockwise from the opposite side of the partitions. This manipulation, occurring when the carrier is in its intermediate position during which the frying doughnuts are floating between the partitions in the bath, will push the frying cakes leftward against the partitions and steady them thereagainst, whereupon lowering the carrier into the bath will tilt the doughnuts sufficiently to cause them to overturn, as diagrammatically illustrated in Figs. 9–12.

Subsequent to the lowering of the carrier to effect the turning of the cakes the rock shaft is reversed to restore the turning rods and the positioning loops to their normal position, and this is accomplished automatically. For this purpose and also for the further purpose of holding the rods and loops operatively disposed, a snap action device is provided which comprises a lever 34 fixed on the rock shaft 28 and having one end 35 engageable with an overhanging stop 36. A spring 37 is anchored at one end to the stop and hung at its opposite end on the lever 34 for movement back and forth across the pivotal axis of the rock shaft, a screw 38 serving to adjustably determine the turning position of the rods 25 and the loops 26 with respect to the size of the doughnut. By depressing the lever 34 the turning rods and the cooperating loops will be moved to their operating positions, as determined by the lever end 35 engaging the stop 36 or its screw.

The trip lever 34 is manually depressed by a lug 39 which is conveniently carried by the carrier lever 13. This lug is pivoted on the lever and is turned by a knob 40 into and out of the path of the trip lever. Being carried in such manner the knob will also serve to actuate the lever to lower and elevate the carrier. Being depressed, the spring 37 will hold the same so disposed until the completion of the turning operation whereupon the trip lever will engage a stop 41 on the vat, during the continued lowering of the tray carrier, and cause the spring to snap the parts back to their normal position as determined by the guide pins 23 or the abutment of the turning rods against the partitions.

The operation is believed to be obvious from the foregoing and may be briefly summed up as follows:— In Fig. 9, the carrier is elevated and a fresh tray of uncooked doughnuts placed thereon. Then the carrier is lowered to permit the cakes to float in the bath for frying on their undersides as depicted in Fig. 10. When this frying is completed the carrier is raised to its intermediate position and the knob 40 rotated to cause the lug 39 to engage and depress the lever 34 sufficiently for the spring 37 to quickly locate the turning rods 25 above the laterally positioned doughnuts, as shown in Fig. 11. While the spring so holds the parts in this position the carrier is lowered to bring the turning rods 25 down against the floating doughnuts and tilt them to an overbalanced position for turning, as illustrated in Fig. 12, to fry the opposite side. As the carrier continues its descent the trip lever 34 engages the stop 41 and snaps the turning rods and positioning loops back to their inoperative positions. Subsequent to the complete frying of the cakes the carrier is elevated to its uppermost position and the tray with its fried batch ejected onto the drain table 6. This ejection may be incidental to the introduction of a fresh tray at the front of the machine.

To facilitate replacing the vat 2' the latter is made removable by having a marginal flange 44 conformably overlying the bevel 8 to which it is secured by removable fasteners 45. When it becomes necessary to repair the vat or to clean the machine the fasteners are removed and the vat lifted free of the machine, after first detaching the carrier frame, so as to give access to all parts thereof.

A modified discharge for the doughnuts is illustrated in Figs. 14 through 17 wherein the inner end portion 46 of the drain table slopes transversely for better drainage of the drippings. From along a substantially diagonal line the outer portion 47 of the table inclines decidedly more as well as outwardly for collecting the fat in the opposite corner from which leads a spout 48 to a suitable vessel 49. Superimposed upon the drain table is a frame 50 tiltably mounted on the pivots 51 about an axis substantially parallel to the diagonal ridge 52 joining the inner and outer portions of the table. The frame has an open bottom and is preferably rectangular in shape to conform generally to that of the doughnut trays 4.

While the tiltable drain frame 50 may be manually tilted or lowered, it is desirable to have the frame so poised as to automatically tilt upon receiving a tray of doughnuts and then to return itself to its horizontal tray receiving position upon removal of the drained tray. For this purpose the pivots 51 are located to dispose the tilting axis parallel to the tray diagonal but short thereof. When a doughnut ladened tray is pushed out onto the frame its balanced condition will be disturbed to cause the outer portion of the frame to dip somewhat as indicated by broken lines 53 in Fig. 17. When in this position of the tray the liquid fat on the wire mesh of the tray will travel a zigzag course into the channeled borders and finally emerge through the corner opening 54 onto the outer table part 47. The balanced condition of the frame is such as to permit this tilting without varying or disarranging the doughnuts on the tray; and if desired, some suitable retarding means may be employed for this purpose. A weight 55 serves to restore the frame to its balanced horizontal position after removal of the tray.

The tilting frame is provided with opposite openings 56 by which the opposite margins of a tray may be grasped by the hands for lifting it from the frame.

The foregoing description is illustrative of the inventive principles involved, which may obviously assume other physical embodiments without departing from the spirit or scope of the claimed subject matter.

What is claimed is:

1. A doughnut machine having a vat, a doughnut carrier, means for lowering and elevating the carrier into and out of the vat, and means operatively connected to said lowering and elevating means for turning the doughnut by and during such carrier movement.

2. A doughnut machine having a vat, a doughnut carrier, means for lowering and elevating the carrier into and out of the vat, turning means on the carrier, and means for locating the doughnuts in the path of the turning means to be engaged and tilted thereby during such carrier movement.

3. A doughnut machine having a vat, a doughnut carrier, means for lowering and elevating the carrier into and out of the vat, means on the carrier for turning the doughnuts as they float in the vat, means for positioning the floating doughnuts in the path of the turning means, and means for moving said turning means and said positioning means to and from their operative positions.

4. A doughnut machine having a vat, a doughnut carrier, means for lowering and elevating the carrier into and out of the vat, means on the carrier for turning the doughnuts as they float in the vat, means for positioning the floating doughnuts in the path of the turning means, and means for moving said turning means and said positioning means to and from their operative positions, said moving means embodying a spring snap action device operable to move and hold said turning means and said positioning means to and in both operative as well as inoperative positions.

5. A doughnut machine having a vat, a doughnut carrier, means for lowering and elevating the carrier into and out of the vat, means on the carrier for turning the doughnuts as they float in the vat, means for positioning the floating doughnuts in the path of the turning means, means for moving said turning means and said positioning means to and from their operative positions, said moving means embodying a spring snap action device operable to move and hold said turning means and said positioning means to and in both operative as well as inoperative positions, and means for automatically actuating the spring snap action device by and during movement of the carrier.

6. A doughnut machine having a vat, a doughnut carrier, means for lowering and elevating the carrier into and out of the vat, means on the carrier for turning the doughnuts as they float in the vat, means for positioning the floating doughnuts in the path of the turning means, means for moving said turning means and said positioning means to and from their operative positions, said moving means embodying a spring snap action device operable to move and hold said turning means and said positioning means to and in both operative as well as inoperative positions, means for automatically actuating the spring snap action device by and during movement of the carrier subsequent to the turning operation, and means by which the action device may be manually set for effecting the turning of the doughnuts.

7. A doughnut machine having a vat, a doughnut carrier, means for lowering and elevating the carrier into and out of the vat, turning means on the carrier, means for locating the doughnuts in the path of the turning means to be engaged and tilted thereby during such carrier movement, means for varying the operative position of said turning means to accommodate doughnuts of different sizes, and means cooperating with said positioning means to adapt the latter to different sizes of doughnuts.

8. A doughnut machine having a vat, a doughnut carrier, means for lowering and elevating the carrier into and out of the vat, and turning apparatus removably supported by said carrier and operable by and during movement of the carrier.

9. A doughnut machine having a vat, a doughnut carrier, means for lowering and elevating the carrier into and out of the vat, and turning apparatus removably supported by said carrier and operable by said lowering and elevating means.

10. A doughnut machine having a vat, a doughnut carrier, means for lowering and elevating the carrier into and out of the vat, a locating frame slidable on the carrier and having a horizontal turning rod movable to and from an operative position, and a positioning member swingable to and from a position beneath the rod to operatively dispose the doughnuts with respect thereto.

11. A doughnut machine having a vat, a doughnut carrier, means for lowering and elevating the carrier into and out of the vat, a frame on the carrier divided by partitions to divide the doughnuts into groups, a locating frame slidable on the first frame and having turner rods normally disposed adjacent the partitions and movable therefrom with the sliding of the locating frame to a position for engaging the floating doughnuts for imparting a turning motion thereto upon movement of the carrier, and means for aligning the doughnuts against the partitions to be so engaged by the rods.

12. A doughnut machine having a vat, a doughnut carrier, means for lowering and elevating the carrier into and out of the vat, a frame on the carrier divided by partitions to divide the doughnuts into groups, a locating frame slidable on the first frame and having turner rods normally disposed adjacent the partitions and movable therefrom with the sliding of the locating frame to a position for engaging the floating doughnuts for imparting a turning motion thereto upon movement of the carrier, said partitions consisting of transverse frame members and a series of depending members spaced apart, positioning members pivotally mounted on the transverse frame members for movement from between the spaced members for pushing the doughnuts against the adjacent partition beneath the turner rods, and means for simultaneously sliding the locating frame and swinging said positioning members to correlate the latter to said rods for doughnut turning.

13. A doughnut machine having a frame, a vat removably disposed on the frame, a doughnut carrier, means for lowering and elevating the carrier into and out of the vat, and turning apparatus removably supported by said carrier and operable by and during movement thereof to effect turning of the doughnuts in their frying bath, said carrier and turning apparatus being adapted for being disposed to permit removal of the vat.

14. A doughnut machine having a vat, a doughnut carrier, means for lowering and elevating the carrier into and out of the vat, said carrier being adapted to support a doughnut tray for being slidably ejected therefrom when the carrier is in an elevated position, a draining frame normally positioned to receive the tray when ejected from the carrier, and means pivotally supporting the draining frame in a balanced state so poised as to be overbalanced by the tray when received from the carrier to tilt with the tray toward the outer end thereof.

15. A doughnut machine having a vat, a tray carrier, means for lowering and elevating the carrier into and out of the vat, a doughnut tray mounted on the carrier, means for tilting the tray to facilitate the drainage of the excess frying liquid from the tray, said tray having a mesh bottom in which the cross strands are so positioned as to incline when the tray is tilted whereby the frying liquid clinging to the strands may flow to the marginal portion of the tray, and means along the margin of the tray for directing the frying liquid from the strands of the tilted tray to a point of collection.

16. A doughnut machine having a vat, a doughnut carrier, means for lowering and elevating the carrier into and out of the vat, said carrier adapted to support a doughnut tray for being slidably ejected therefrom when the carrier is in an elevated position, a draining frame normally positioned to receive the tray when ejected from the carrier, said tray having a wire mesh bottom framed by a border provided with a drain opening diagonally disposed with respect to the mesh, and means for tilting the frame so as to dip the tray at such drain opening.

17. A doughnut machine having a vat, a doughnut carrier, means for lowering and elevating the carrier into and out of the vat, said carrier adapted to support a doughnut tray for being slidably ejected therefrom when the carrier is in an elevated position, a draining frame normally positioned to receive the tray when ejected from the carrier, such tray being of generally rectangular form and having a wire mesh bottom framed by a border provided with a drain opening in one corner diagonally of the mesh, and means for tilting the frame to dip the tray at such corner for the drainage of excess frying fat through the drain opening.

18. A doughnut machine having a vat, a doughnut carrier, means for lowering and elevating the carrier into and out of the vat, said carrier adapted to support a doughnut tray for being slidably ejected therefrom when the carrier is in an elevated position, a draining frame normally positioned to receive the tray when ejected from the carrier, such tray being of generally rectangular form and having a wire mesh bottom framed by a border provided with a drain opening in one corner diagonally of the mesh, means for tilting the frame to dip the tray at such corner for the drainage of excess frying fat through the drain opening, and a drain table underlying the frame, said table inclining to one side and provided with an outer sloping part for receiving the excess fat discharging from the drain opening.

FREDERICK MAIER.